No. 848,344. PATENTED MAR. 26, 1907.
M. E., W. W., H. L. & A. F. BUHSE.
CANDY WRAPPING MACHINE.
APPLICATION FILED AUG. 29, 1906.
9 SHEETS—SHEET 9.
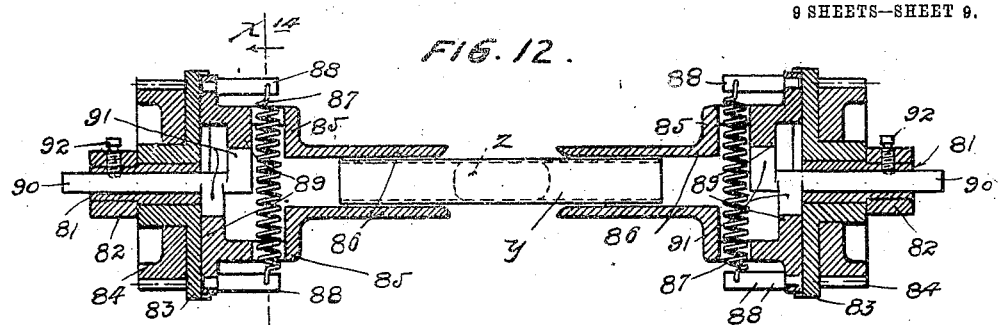
FIG. 12.
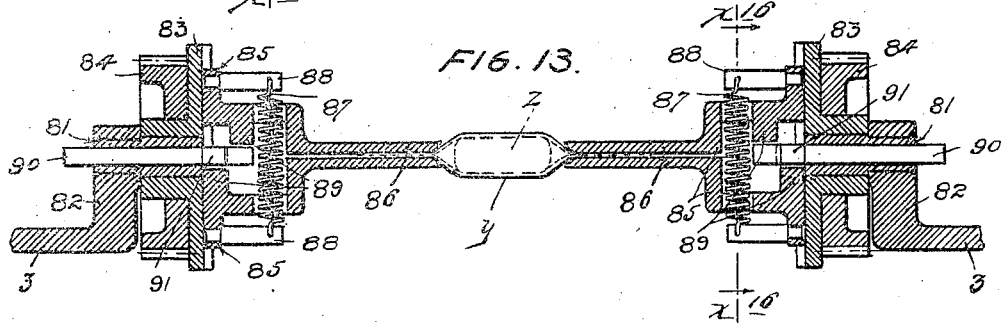
FIG. 13.
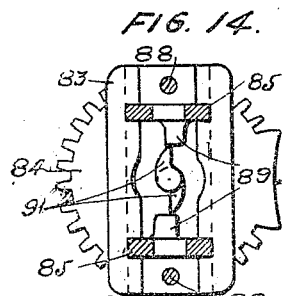
FIG. 14.
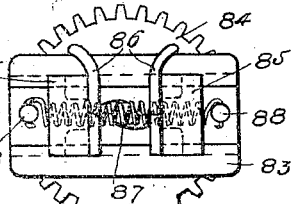
FIG. 15.
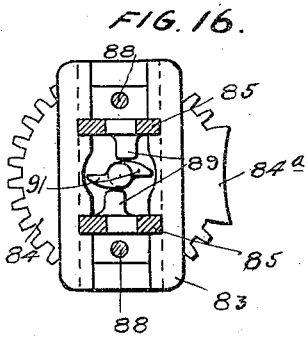
FIG. 16.
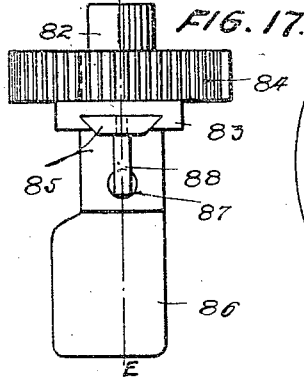
FIG. 17.
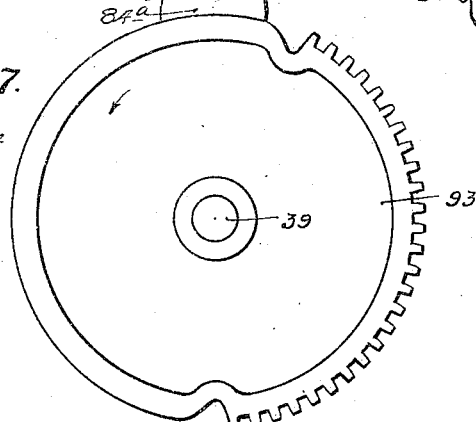
WITNESSES.
J. Jessen
H. D. Kilgore
INVENTORS.
M. E. Buhse,
W. W. Buhse,
H. L. Buhse,
A. F. Buhse,
By their Attorneys,
Williamson Merchant

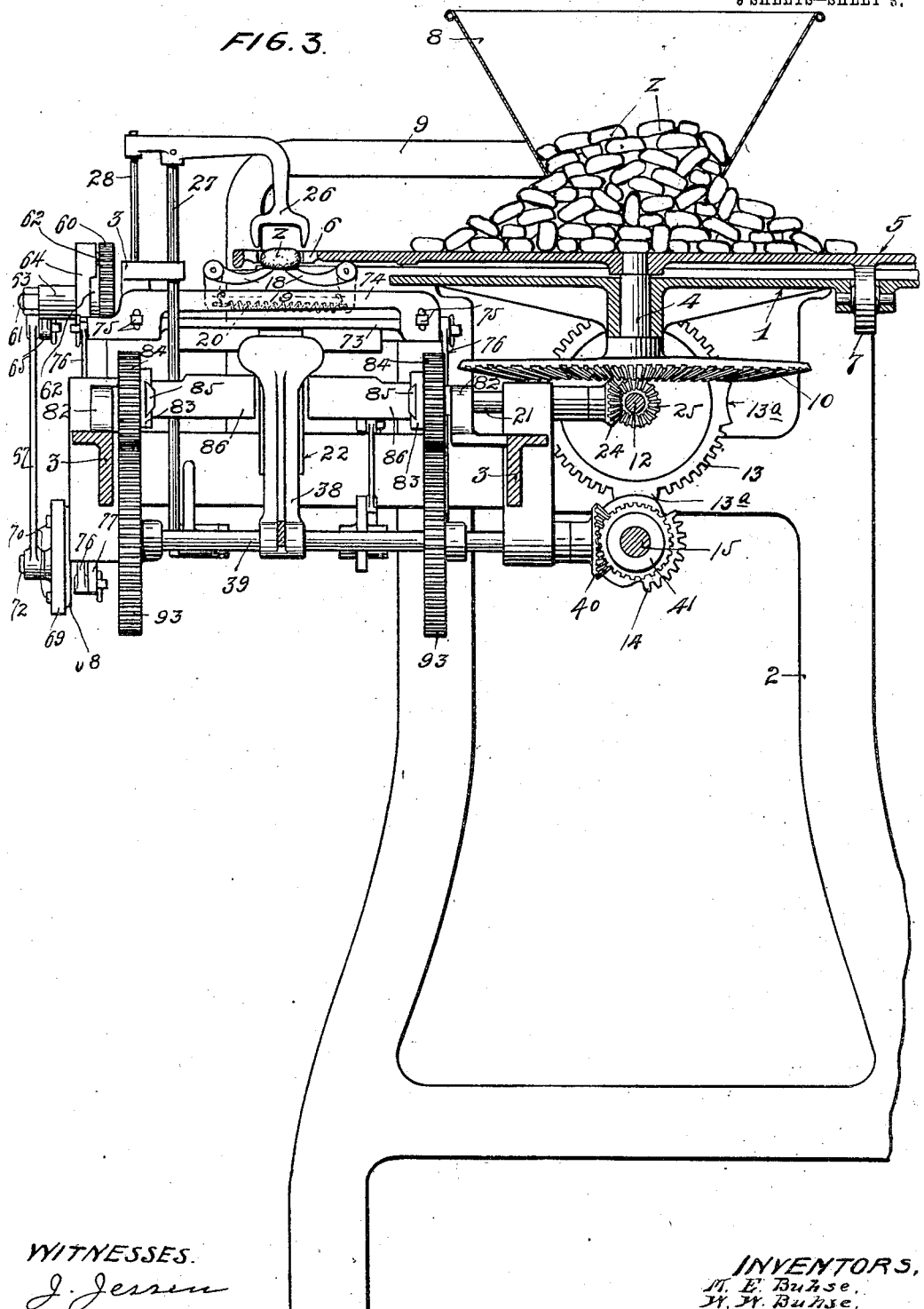

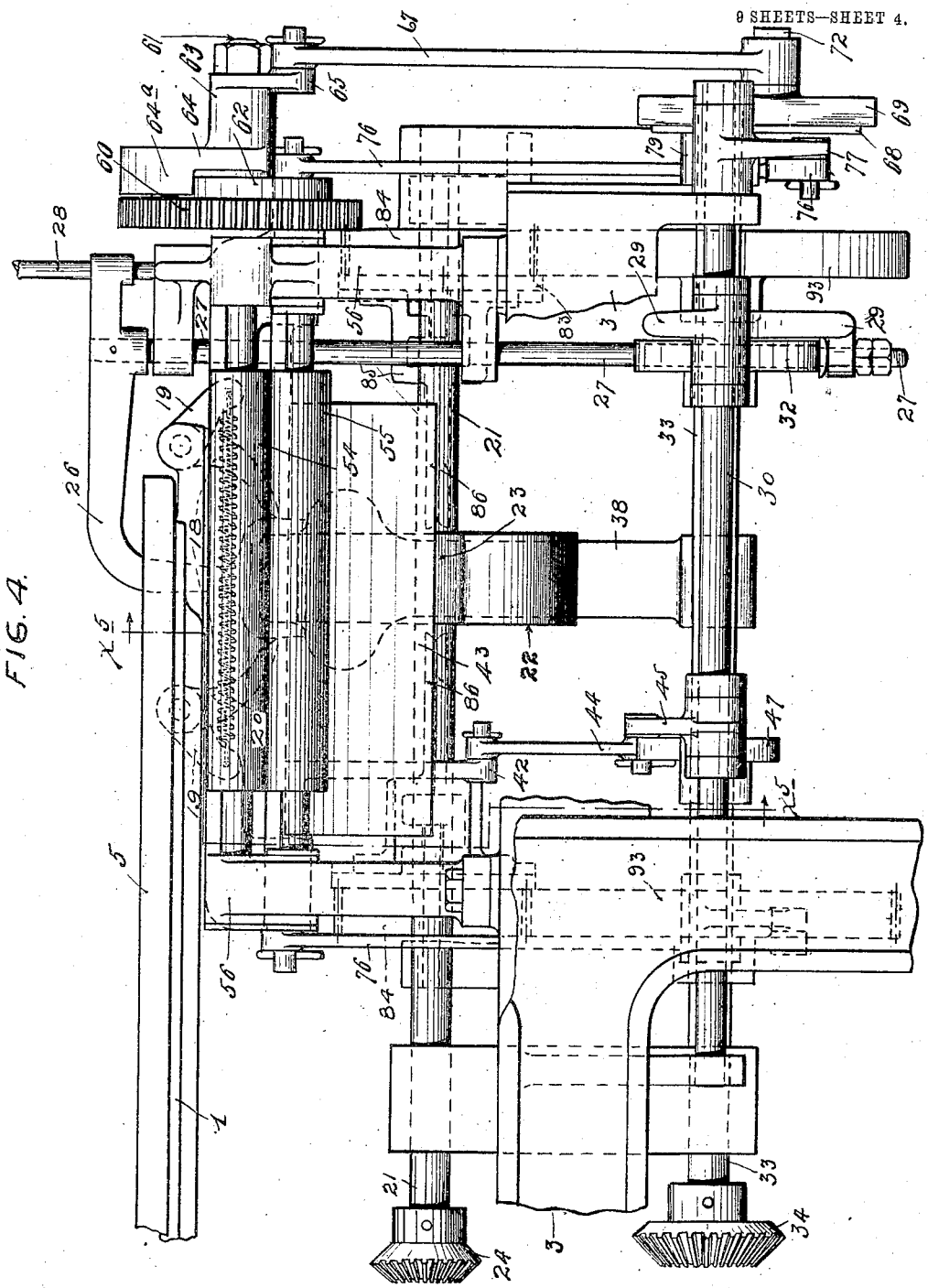

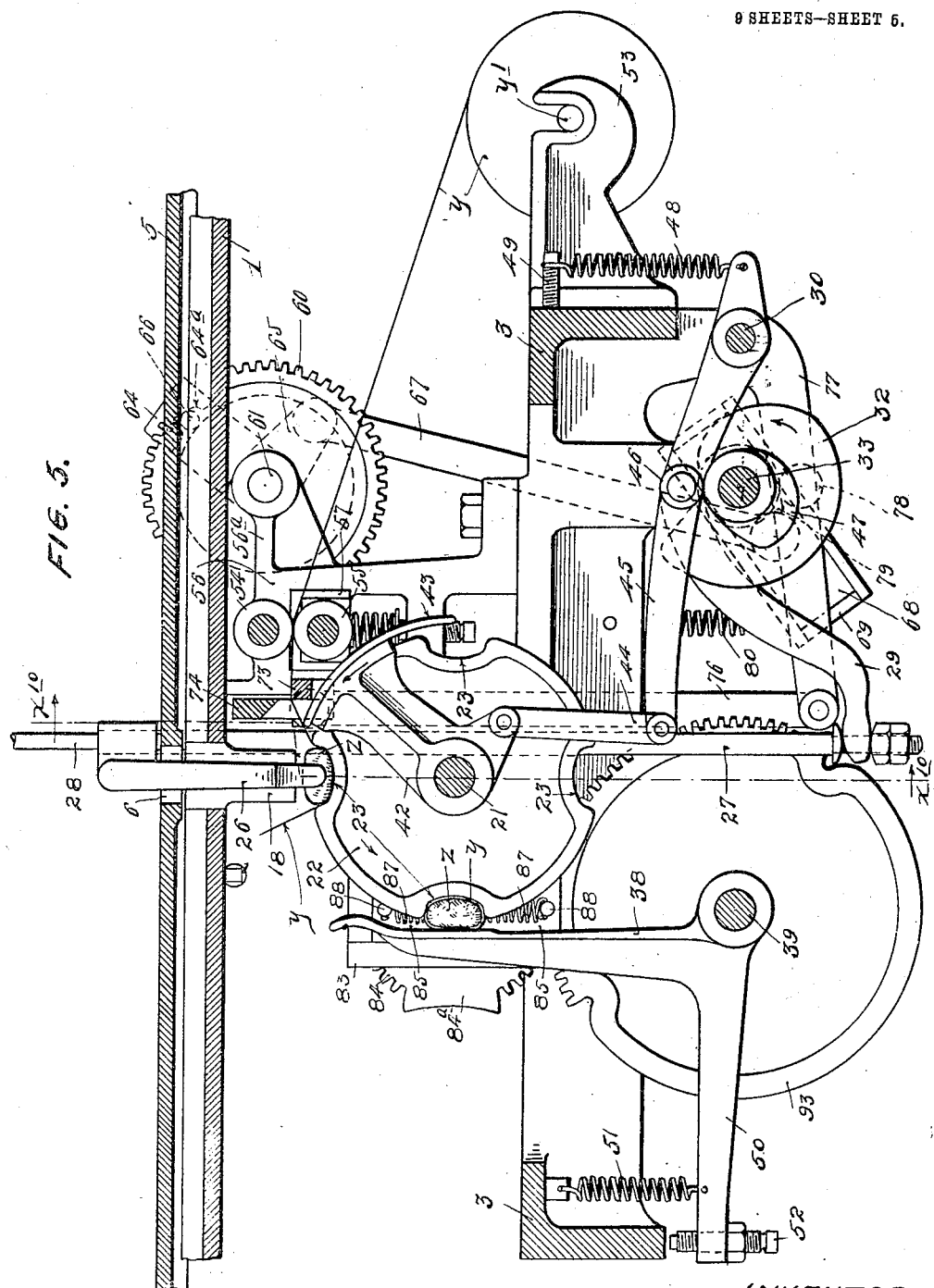

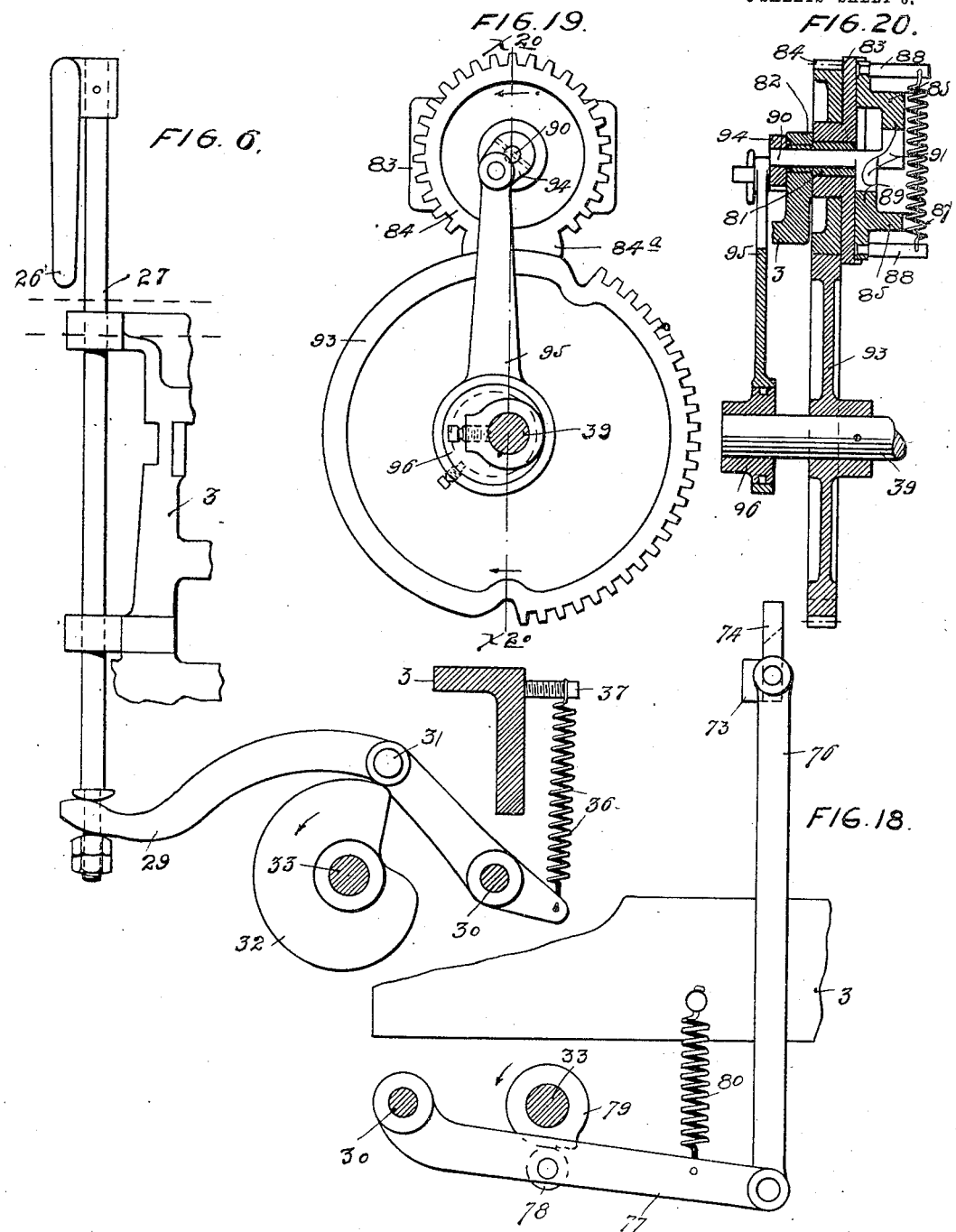

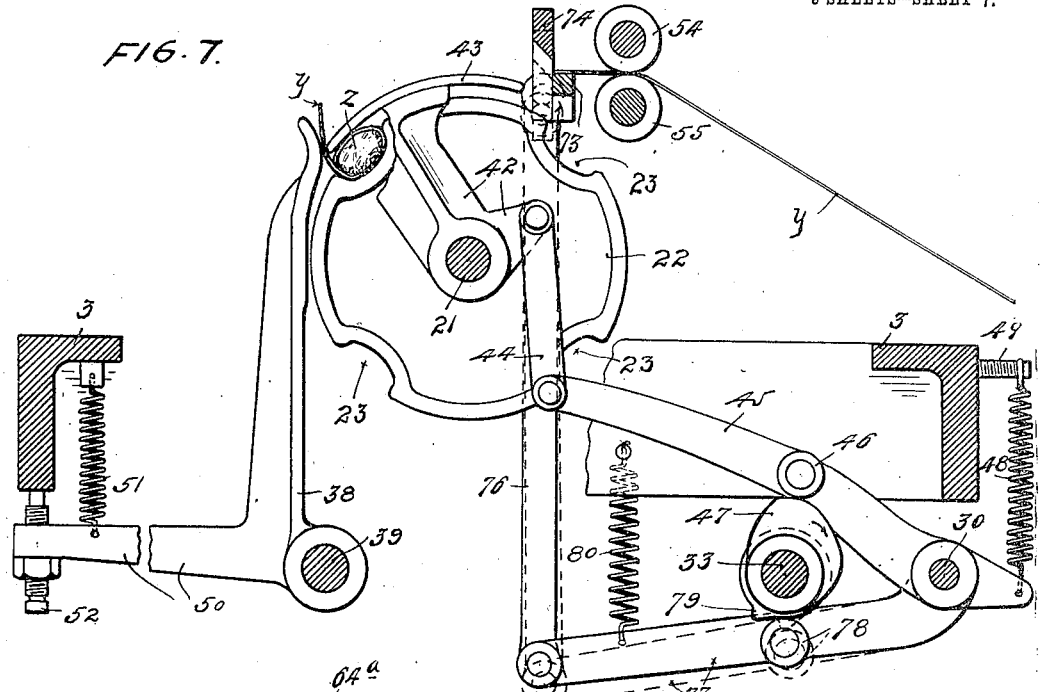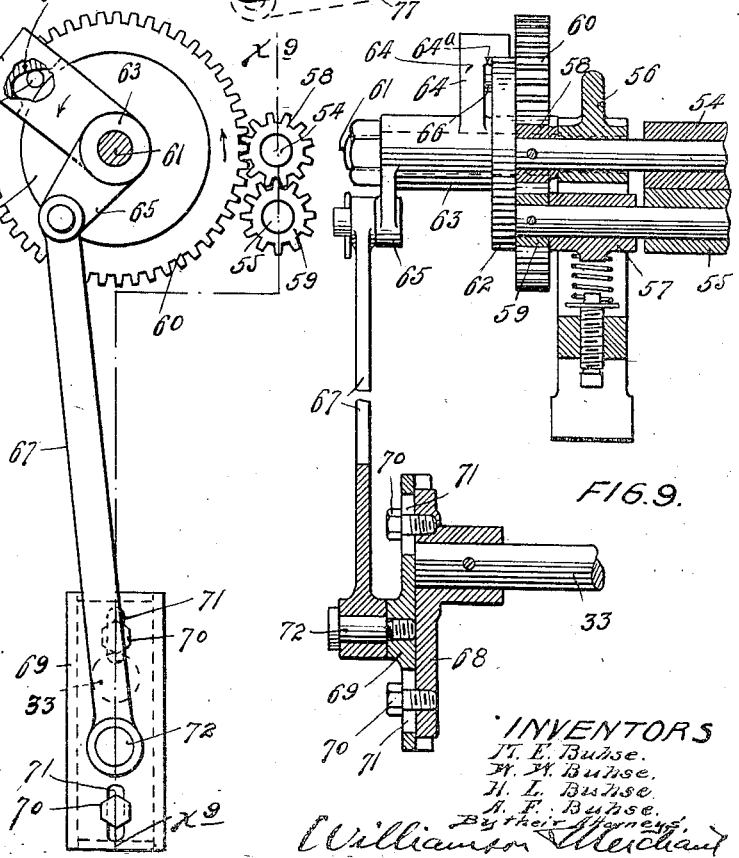

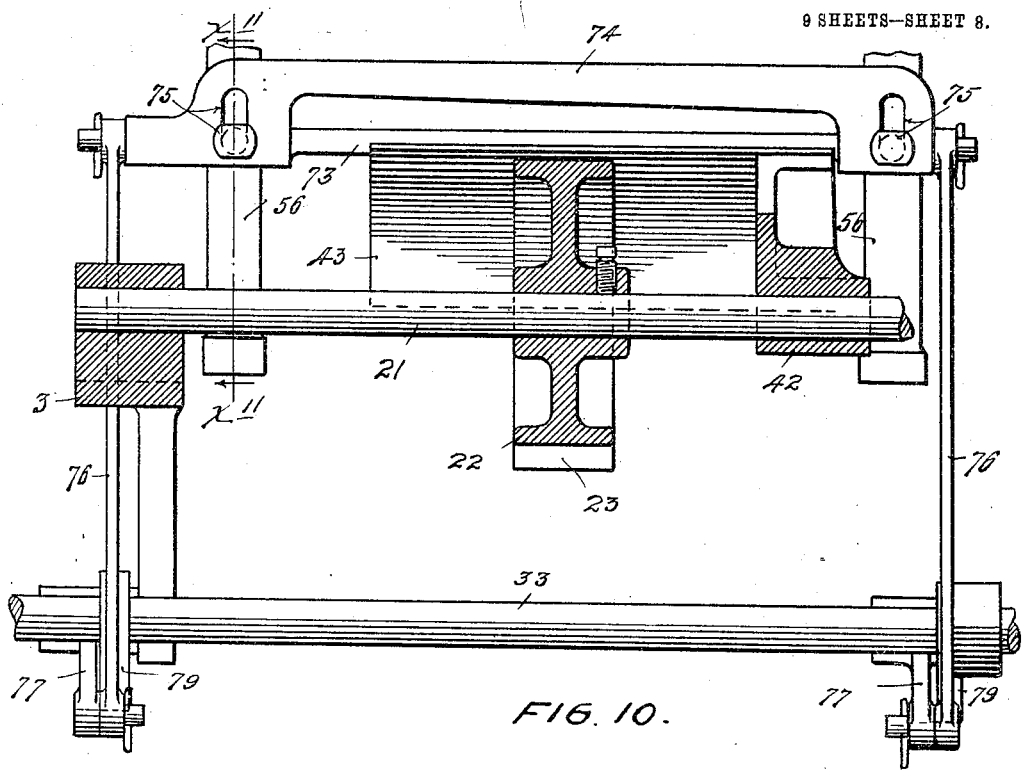
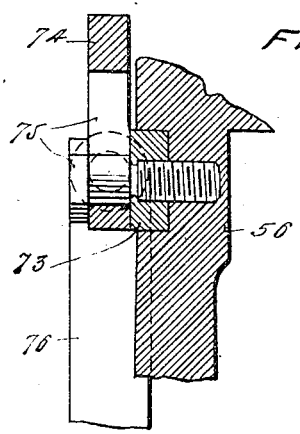

UNITED STATES PATENT OFFICE.

MAXIMILIAN E. BUHSE, WALTER W. BUHSE, HENRY L. BUHSE, AND ALEXANDER F. BUHSE, OF MINNEAPOLIS, MINNESOTA.

CANDY-WRAPPING MACHINE.

No. 848,344.　　　Specification of Letters Patent.　　　Patented March 26, 1907.

Application filed August 29, 1906. Serial No. 332,458.

*To all whom it may concern:*

Be it known that we, MAXIMILIAN E. BUHSE, WALTER W. BUHSE, HENRY L. BUHSE, and ALEXANDER F. BUHSE, citizens of the United States, residing at Minneapolis, in the county of Hennepin and State of Minnesota, have invented certain new and useful Improvements in Candy-Wrapping Machines; and we do hereby declare the following to be a full, clear, and exact description of the invention, such as will enable others skilled in the art to which it appertains to make and use the same.

Our invention has for its especial object to provide an improved machine for applying wrappers to parcels of candy, such as small chunks of taffy; and to this end it consists of the novel devices and combinations of devices hereinafter described, and defined in the claims.

The invention is illustrated in the accompanying drawings, wherein like characters indicate like parts throughout the several views.

Figure 1:
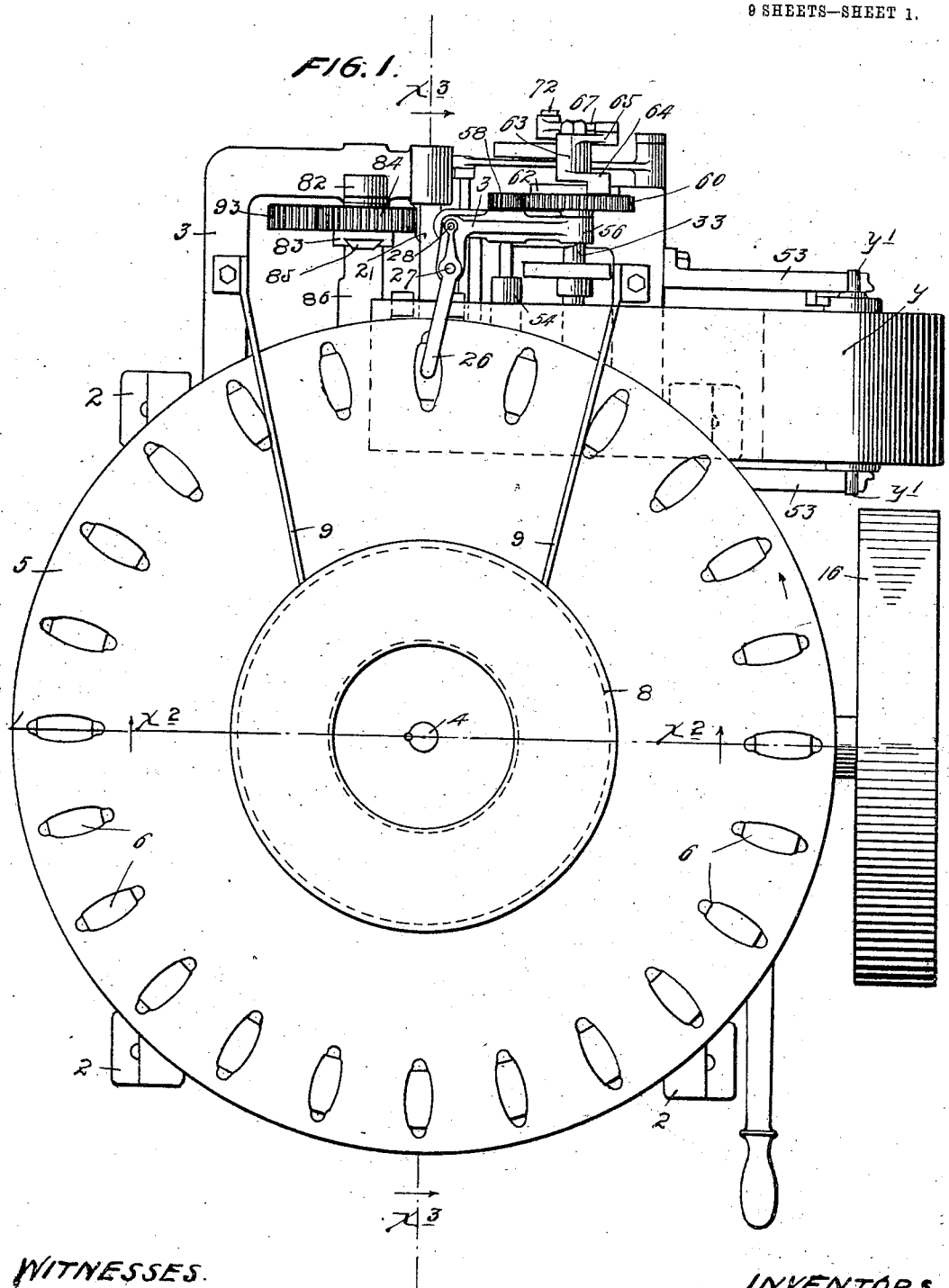
Figure 2:
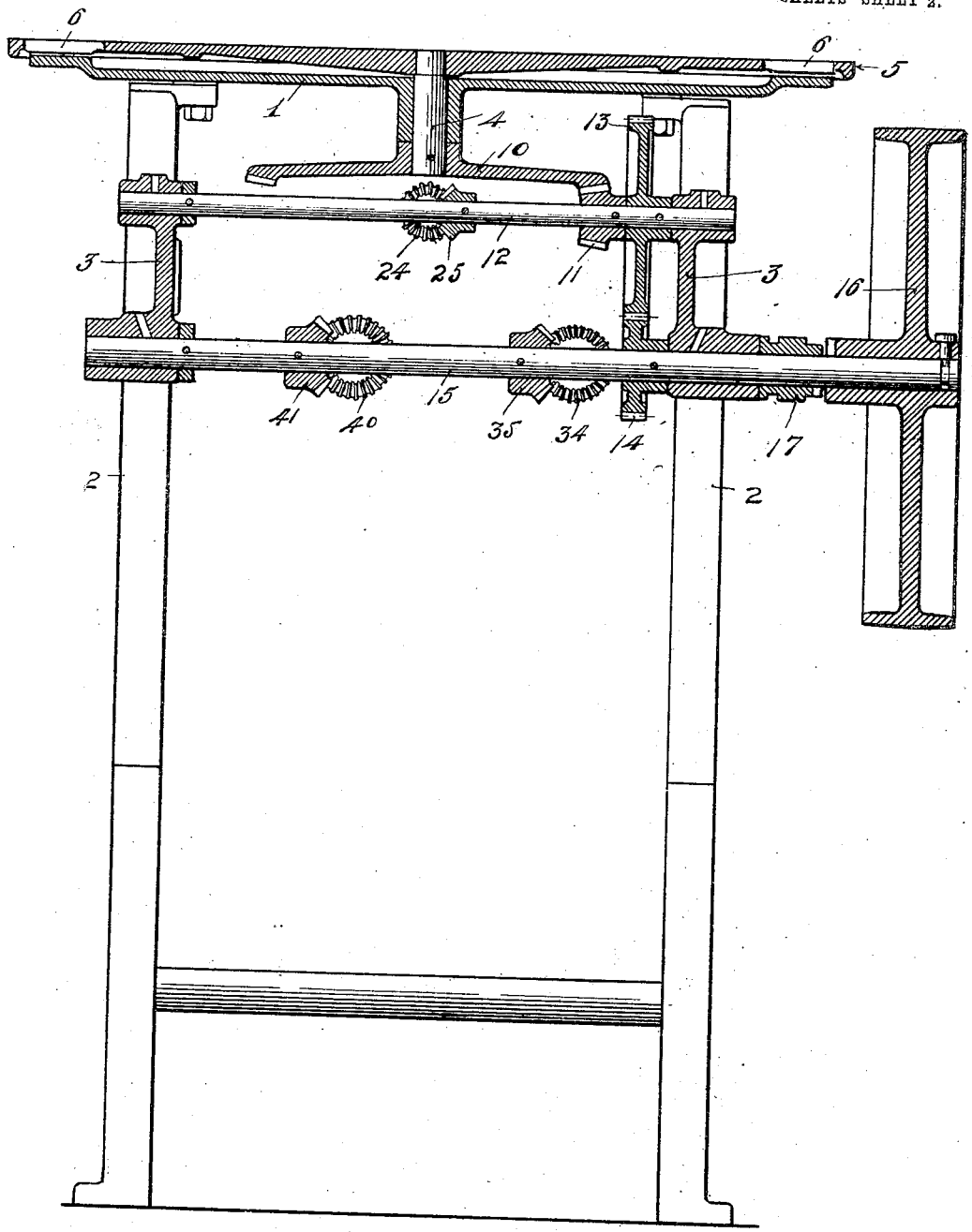

Referring to the drawings, Figure 1 is a plan view of the improved machine. Fig. 2 is a vertical section taken on the line $x^2 x^2$ of Fig. 1, some parts being removed. Fig. 3 is a vertical section taken through the machine approximately on the line $x^3 x^3$ of Fig. 1. Fig. 4 is a view in elevation with some parts broken away and with other parts removed, showing the upper rear portion of the machine looking at the same from the right toward the left with respect to Fig. 1. Fig. 5 is a vertical section taken approximately on the irregular line $x^5 x^5$ of Fig. 4. Fig. 6 is a detail view of the so-called "parcel-positioning" plunger and actuating-cam therefor. Fig. 7 is a view corresponding to Fig. 5 with some parts removed and with some parts moved into other positions. Fig. 8 is a detail view in elevation showing the paper-feeding mechanism looking at the said parts from the right toward the left with respect to Fig. 4. Fig. 9 is a vertical section taken on the line $x^9 x^9$ of Fig. 8. Fig. 10 is a vertical section taken transversely of the machine approximately on the irregular line $x^{10} x^{10}$ of Fig. 5, some parts being removed and some parts being broken away. Fig. 11 is a detail in section on the line $x^{11} x^{11}$ of Fig. 10. Fig. 12 is a horizontal section taken centrally through the paper-twisting devices. Fig. 13 is a vertical section taken centrally through the said paper-twisting devices. Fig. 14 is a vertical section taken on the line $x^{14} x^{14}$ of Fig. 12. Fig. 15 is an end elevation of one of the twisting devices, showing also a segmental gear for actuating the same. Fig. 16 is a section taken on the line $x^{16} x^{16}$ of Fig. 13. Fig. 17 is a plan view of one of the twisting devices. Fig. 18 is a detail in elevation showing the paper-cutter and actuating connections therefor, said parts being viewed in the same direction as Fig. 5 and in a direction from left toward the right with respect to Fig. 10. Fig. 19 is a view in elevation illustrating the twister-actuating mechanism, including a feature which is additional to that shown in the other views; and Fig. 20 is a section taken on the line $x^{20} x^{20}$ of Fig. 19.

A non-rotary table 1 is supported by leg-brackets 2, to which leg-bracket is rigidly secured a laterally-projecting skeleton framework 3. Journaled in the central portion of the table 1 (see Figs. 1, 2, and 3) is a short vertical shaft 4, to the upper end of which is rigidly secured a rotary feed-table 5 in the form of a flat disk or wheel, having near its periphery a plurality of perforations or parcel-receptacles 6, of which, as shown, there are twenty-four. The fixed table 1 is preferably provided with a plurality of small anti-friction-wheels 7, upon which the rotary feed table or wheel 5 is mounted to run.

In the machine shown a hopper 8 overlies the central portion of the rotary feed-table 5, the same being secured in a fixed position by crooked arms 9, the lower ends of which are fixed to the framework 3. This hopper, while a convenience, is not a necessary part of the apparatus. When employed, it serves to deliver the candy parcels or lumps $z$ onto the central portions of the rotary table 5.

Rigidly secured to the lower end of the short vertical shaft 4 is a large bevel-gear 10, which gear meshes with a bevel-pinion 11, carried by a transverse counter-shaft 12, mounted in suitable bearings on the framework 3, as best shown in Figs. 2 and 3. The gear 10 and pinion 11 have a relation of six to one in diameter and one to six in their speed of rotation. The shaft 12 carries a spur-gear 13, that meshes with a spur-pinion 14, which latter is carried by a driving-shaft 15, also mounted in suitable bearings in the framework 3. The pinion 14 is a segmental pinion and has teeth for less than one-half of its circumference, the remainder of its circumference being smooth. The gear 13 has four segmental groups of teeth and between each group of teeth has a smooth concave surface 13ª. Under rotation of the driving-shaft 15 the segmental pinion 14 imparts intermittent movement to the gear 13, and hence to the rotary table 5. More particularly stated, under each complete rotation of the shaft 15 the pinion 14 imparts a one-fourth rotation to the gear 13 and a one twenty-fourth rotation to the rotary feed-table 5, and each such intermittent movement is produced under less than one-half rotation of the shaft 15, so that the said table 5 is held stationary during approximately one-half of the time.

On the outwardly-projected end of the driving-shaft 15 is a loose pulley 16, that is adapted to be coupled to the shaft 15 at will by a sliding clutch 17 of the usual or any suitable construction. The pulley 16 may be continuously driven by a power-driven belt. (Not shown.)

At one point above the framework 3 and below the line of movement of the parcel-receptacles 6 of the table 5 the fixed table 1 is cut away and is provided with a pair of yielding parcel-supports afforded by a pair of wide-faced pivoted dogs 18, which dogs are pivoted to the said fixed table 1 and are provided with laterally-offset arms 19, that are connected by a coiled spring 20, as best shown in Figs. 3, 4, and 5. The spring 20 normally holds these yielding supports or dogs 18 in the position shown in Fig. 3.

Rigidly secured to and carried by a shaft 21, that is journaled in the frame 3, is a wheel 22, that constitutes a parcel holder and carrier and is provided with a plurality of peripheral pockets or notches 23, of which, as shown, there are four located ninety degrees apart. This parcel holder and carrier is located just below the free ends of the yielding support or dog 18. (See Figs. 3, 4, 5, and 10.) At its inner end the shaft 21 is provided with a miter-gear 24, that meshes with a miter-gear 25 of the intermittently-driven shaft 12, (see Figs. 2, 3, and 4,) so that the said wheel 22 will be given a one-fourth rotation for each complete rotation of the driving-shaft 15. The said wheel 22 is of course intermittently driven, and it remains stationary approximately one-half of the time and when stationary one of its pockets 23 always stands just below the yielding supporting-dogs 18.

Standing normally above the rotary table 5 and just above one of its parcel-receptacles 6 in vertical line with the free ends of the supporting-dogs 18 is an approximately U-shaped presser-head 26, the stem of which is rigidly secured to a pair of vertically-movable plungers 27 and 28, that are mounted in suitable bearings on the frame 3. The main plunger 27 (see Figs. 1, 3, 4, 5, and 6) is connected at its lower end to the free end of an actuating-lever 29, which lever is pivoted on a rod 30, supported by the framework 3. The lever 29 has a laterally-projecting roller 31, that is subject to a cam 32, carried by a counter-shaft 33, mounted in suitable bearings on the frame 3 and provided at its inner end with a miter-gear 34, that meshes with a miter-gear 35 on the driving-shaft 15, so that said shaft 33 will be given one rotation for each rotation of said driving-shaft. A coiled spring 36, attached to a projecting arm of the lever 29, and to a pin 37 on the frame 3, (see Fig. 6,) yieldingly holds the roller 31 in engagement with the cam 32 and tends to force the plungers 27 and 28 and presser-head 26 downward.

Located in front of the parcel-carrying wheel 22 is a presser-arm or yielding abutment 38, which at its lower end is, as shown, pivoted on a counter-shaft 39, that extends parallel to the counter-shaft 33 and is also mounted in suitable bearings of the frame 3. (See particularly Figs. 2, 3, and 5.) This shaft 39 at its inner end is provided with a miter-gear 40, that meshes with a miter-gear 41 on the driving-shaft 15.

Loosely mounted on the counter-shaft 21, (see Figs. 5, 7, and 10,) at one side of the carrier-wheel 22, is a short-armed bell-crank 42, to the upper arm of which is rigidly secured a thin segmental tucker-blade 43. The tucker-blade 43 projects laterally from the upper arm of said bell-crank and extends over and lies close to the peripheral portion of the said carrier-wheel 22. The normal position of this tucker-blade is best shown in Fig. 5. The short lower arm of the bell-crank 42 is connected by a link 44 to the free end of a tucker-actuating lever 45, which lever is, as shown, pivotally mounted on the rod 30. At its intermediate portion the lever 45 is provided with a laterally-projecting roller 46, that rides upon a cam 47, as best shown in Figs. 5 and 7, which cam is carried by the counter-shaft 33. A coiled spring 48, attached to a short arm of the lever 45 and to a pin 49 on the frame 3, (see Figs. 5 and 7,) holds the roller 46 engaged with the cam 47 and tends to hold the tucker 43 in its normal position. (Shown in Fig. 5.)

The presser-arm 38, just above described, is, as shown, provided with an arm extension 50, that is connected to a portion of the frame 3 by a coiled spring 51, which spring yieldingly presses the arm 38 toward the carrier-wheel 22. The movement of the presser-arm 38 toward said carrier-wheel is limited by a set-screw 52 in the free end of the arm 50, that engages with a fixed part of the frame 3. (See Figs. 5 and 7.)

The paper for wrapping the candy parcels or chunks is supplied from a roll $y$, which, as shown, is wound upon a spindle $y'$, that is detachably held by notched brackets 53, secured to the frame 3, as best shown in Figs. 1 and 5. The web of paper from the roll $y$ is passed between a pair of coöperating feed-rollers 54 and 55, (see Figs. 4, 5, and 7,) the former of which is journaled in bearing-brackets 56 on the frame 3, and the latter of which is journaled in spring-supported boxes 57, that are slidably mounted in said brackets 56, as best shown in Figs. 5 and 9. The shafts of the rollers 54 and 55 project at one end and are provided, respectively, with intermeshing pinions 58 and 59. (See Figs. 8 and 9.) The pinion 58 meshes with a larger spur-gear 60, loosely journaled in a stud 61, secured to a projection $56^a$ of one of the bearing-brackets 56, as best shown in Fig. 5. A smooth disk 62 is secured to one side of the gear 60, as best shown in Figs. 8 and 9. Mounted to vibrate on the stud 61 is a sleeve or hub 63, which has two arms 64 and 65. The arm 64 at its free end overlies the smooth disk 62 and is provided with a beveled pocket $64^a$, in which is a clutch-roller 66. The arrangement is such that the clutch-roller 66 will be caused to slide upon the disk 62 when the arm 64 is moved in the direction of the arrow marked thereon in Fig. 8, but will slip under reverse movement of the said arm. The said arm, roller, and disk constitute a frictional pawl-and-ratchet device for transmitting intermittent motion to the paper-feeding rollers 54 and 55. The arm 65 of the said pawl-and-ratchet device is connected by a link 67, (see Figs. 5, 8, and 9,) to a crank carried by the outer end of the shaft 33. This crank, as shown in Figs. 8 and 9, is an adjustable crank made up of a crank-plate 68, secured to said shaft, and a crank-head 69, which is radially adjustable on said crank-plate and is adapted to be secured thereto in different adjustments by means of screws 70, which, as shown, work through slots 71 in said head and are screwed into said plate. The crank-head 69 carries a wrist-pin 72, to which the lower end of the link 67 is directly pivoted. Under different adjustments of the crank-head 69 different amounts of paper may be fed forward by the rollers 54 and 55 under each rotation of the counter-shaft 33 and driving-shaft 15.

By the feed-rollers 54 and 55 the web of paper is fed forward over the carrier-wheel 22 and over the empty uppermost pocket thereof, substantially as shown in Fig. 5. Just in front of the feed-roller 55 is a fixed shearing-bar 73, (see Figs. 3, 5, 7, and 10,) which bar is rigidly secured at its ends to the laterally-spaced bearing-brackets 56. A movable sharp-edged shearing bar or knife-blade 74 coöperates with said bar 73. This bar or blade 74 is attached to the brackets 56 by slot-and-pin connections 75, and to the ends thereof are pivotally attached the upper ends of links 76. These links 76 at their lower ends are pivotally attached to levers 77, (see Figs. 5, 7, 10, and 18,) which levers at their outer ends are pivoted on the rod 30 before noted. At their intermediate portions the levers 77 are provided with laterally-offset rollers 78, that are subject to cams 79 on the cam-shaft 33. Coiled springs 80, attached to said levers 77 and to the frame 3, keep the rollers 78 pressed against the cams 79 and normally hold the knifeblade 74 in its raised position.

The paper or wrapper twisting devices are best shown in Figs. 3, 5, and 12 to 17, inclusive. There are two of these paper-twisting devices, and the two twisters are located in axial alinement with each other, one on each side of the carrier-wheel 22 and in axial alinement with the pocket 23 of said wheel that stands at the extreme left with respect to Fig. 5. Each twister comprises a hollow stud 81, (see particularly Figs. 12 and 13,) which is fixed in a bearing-lug 82, that is rigid on the frame 3. Rotatively mounted on the stud 81 is a face-plate 83, to the hub of which is secured a spur-pinion 84, which pinion has a concave toothless segmental section $84^a$. The face-plate 83 has a diametrically-extended dovetailed channel, in which works a pair of opposing clamping-heads 85, which have extended clamping-jaws 86. The heads 85 are drawn toward each other by a coiled spring 87, which, as shown, is passed through clearance-passages therein, and are attached to studs 88 on the base-flanges thereof. On the inner portions of the clamping-heads 85 are laterally-offset cam-lugs 89. Extending through the hollow trunnion or stud 81 is a stem 90, which at its inner end is provided with laterally-offset cam-lugs 91, each of which acts upon one of the cam-lugs 89 of the clamping-heads 85. As illustrated in Figs. 12 and 13, the stem 90 is held against rotation by means of a set-screw 92, which is passed through the lug 82 and hollow stud 81 and impinges upon the said stem 90.

Coöperating with each gear or pinion 84 is a segmental gear 93, that is carried by the counter-shaft 39. The gears 93 have teeth extending approximately half-way around the same, and the relation of the gears 93 and 84 are such that the twisters will be given one complete rotation for each complete rotation of the counter-shaft 39 and driving-shaft 15, but will be held stationary in the position shown in Fig. 15 throughout one-half of each rotation of the said shafts 39 and 15. As shown in Figs. 12, 14, and 15, when he gears 84 are at rest the cam-lugs 91, acting on the cam-lug 89, hold the jaws 86 of the clamping-heads 85 opened up or separated, so that the loose ends of the wrapper, which has been applied to a candy-parcel, may be freely carried between said jaws by a movement of the carrier-wheel 22 in the direction of the arrow marked thereon in Fig. 5. As shown in Figs. 13 and 16, when the lugs 89 by a slight rotation of the twisters, have been carried out of engagement with the coöperating cam-lugs 91 the springs 87 cause the jaws 86 to engage and tightly pinch the loose ends of the paper wrapper, so that under continuous rotary movements of the twisters the two ends of the wrapper will be twisted, it of course being understood that the candy-parcel and the central portion of the wrapper are at such time held against rotation by the carrier-wheel 22 and coöperating presser-arm 38. (See Fig. 5.) At the completion of the rotation of the twisters the jaws 86 are separated and caused to release the twisted ends of the wrapper by the reëngagement of the lugs 89 with the coöperating fixed lugs 91.

A summary of the operation of the machine above described is substantially as follows: The direction in which the various rotary parts of the machine move are indicated by arrows marked on the respective parts in the several views thereof. The parcel-receptacles 6 of the rotary table 5 are kept loaded with candy parcels or chunks z by an operator or attendant standing at the side of the machine, and under rotary movements of said table 5 the parcels within the receptacles thereof are supported by and will slide over the underlying portion of the fixed table 1. Under each rotation of the driving-shaft 15 and during a time represented by one half-rotation thereof the table 5 is given an intermittent or one twenty-fourth step of movement, which serves to position one of the candy-parcels z directly over the yielding supporting-dogs 18 and directly under the U-shaped presser-head 26, which head, as will presently be noted, operates as a parcel-positioning device. Immediately after the rotary table 5 has been given its intermittent movement the high portions of the cam 32 are moved out from under the roller 31 of the lever 29, and the spring 33 then becomes active to force downward the pronged or U-shaped head 26, thereby causing the latter to force the positioned candy parcel or chunk z into the underlying pocket 23 of the carrier-wheel 22, as shown in Figs. 4 and 5. By reference to Fig. 4 it will be seen that when the head 26 is thus forced downward its prongs engage the yielding dogs 18 and press the same out of the way without producing pressure on the candy parcel or chunk z. The candy-parcels thus delivered into the pocket 23 of the carrier-wheel 22 is of course pressed onto the underlying portion of the paper web y. Immediately after the candy-parcel z has thus been delivered into the pocket 23 the cams 79, acting on the rollers 78 of the levers 77, force the knife-blade 74 downward and causes the same to cut off the end section of the wrapping web or paper y. Immediately following the cutting of the wrapper from the paper web the head 26 is returned to normal position, and the cam 47 comes into action on the roller 46 of the lever 45 and throws the segmental tucker-blade 43 forward, or in the direction of the arrow marked adjacent thereto, in Fig. 5. Immediately following the initial movement of the tucker-blade 43 the intermittent movement of the carrier-wheel 22 is begun, and the timing of the movements of said parts 43 and 22 is such that they will simultaneously reach the position shown in Fig. 7, in which position it will be noted that the tucker-blade 43 has tucked or folded the rear portion of the wrapper over the candy parcel or chunk z and has delivered the forward portion of said wrapper against the upper end of the yielding presser-arm 38. The forward movement of the tucker-blade 43 ceases at the position shown in Fig. 7; but the wheel 22 continues its intermittent movement until it reaches the position shown in Fig. 5, in which position the wrapper is completely folded around the candy parcel or chunk z. The intermittent movement of the carrier-wheel 22 is of course in a constant direction; but the tucker-blade 43 commences its return movement immediately after it has performed the work just above noted. The rotary movements of the twisters above described is begun immediately after the intermittent movement of the carrier-wheel 22 has been completed, and the entire movement of the twisters takes place while the said wheel 22 is at rest. The operation of the twisters has already been described in detail. The paper-feeding movement of the rollers 54 and 55 takes place while the carrier-wheel 22 is being given its intermittent movement and of course while the knife-blade 74 is raised. The candy-parcels with the wrappers applied thereto dropped from the pockets 23 of the carrier-wheel 22 is there moved downward and out of engagement with the presser-arm 38. It may of course be caught within any suitable receptacle or may be dropped onto the floor.

With the twisters constructed and arranged as above described little less than one complete rotary twist will be given to the ends of the wrapper. In Figs. 19 and 20 there is illustrated an additional or auxiliary device whereby an increased amount of twist may be given the ends of the wrapper. In this construction the stem 90, which carries the relatively fixed cam-lugs 91, instead of being absolutely fixed are rigidly secured at their outer ends to a short crank 94, which in turn is connected by an eccentric strap and rod 95 to an eccentric 96, carried by the projecting end of the shaft 39. With this arrangement of eccentrics and crank in advance of the rotary movement of the twisters in the direction of the arrows marked thereon in Figs. 14 and 15 the stem 90 and its cam-lugs 91 will by the eccentric 96 and connections be given an oscillatory movement in a reverse direction, thereby closing up the jaws 86 on the ends of the wrapper before the twisters have begun their rotary movement. Then as the twisters make their rotary movement the said eccentric and connections will oscillate the said stem 90 and cam-lugs 91 in the same direction as said twisters are moved, thereby delaying the reëngagement of the coöperating cam-lugs 89 and 91, and hence of course delaying the separation of the jaws 86. In this way, as is evident, a complete rotary movement, or even more, may be given to the ends of the wrapper.

The term "pockets" as used in the claims in connection with the carrying wheel or device is used in a broad sense to include any and all forms of holders which are adapted to receive and hold the pieces of candy or other parcels to which the wrappers are to be applied.

What we claim is—

1. In a machine of the kind described, the combination with an intermittently-movable carrier having pockets to receive the parcels and wrappers, of a vibratory tucker operative to force the wrapper over the positioned parcel, an abutment coöperating with said carrier to hold the wrapper around the positioned parcel, and a pair of twisters located one on each side of said carrier and operative on the ends of the wrapper to twist the same, while subject to said abutment, substantially as described.

2. In a machine of the kind described, the combination with an intermittently-movable carrier-wheel having pockets to receive the wrappers and parcels, an intermittently-movable vibratory arm having a segmental tucker-flange working adjacent to the periphery of said carrier-wheel and operative to force the wrapper over the parcel, a yielding abutment coöperating with said carrier-wheel to hold the wrapper applied around the parcel, and a pair of intermittently-operative twisters operative on the ends of the folded and applied wrapper, substantially as described.

3. In a machine of the kind described, the combination with an intermittently-movable carrying-wheel having pockets to receive parcels and applied wrappers, of means for feeding a continuous web of wrapping-paper to said carrying-wheel, and for cutting the same to form the wrappers, means for applying the parcels in succession to the pockets of said carrier-wheel, a tucker movable circumferentially of said carrier-wheel to force the several wrappers over the positioned parcel, an abutment coöperating with said carrier-wheel to hold the parcel and applied wrapper in position for the twisting of its ends, and a pair of twisters located on opposite sides of said carrier-wheel, and operative to twist the ends of said wrapper, substantially as described.

4. In a machine of the kind described, the combination with an intermittently-movable carrier-wheel having peripheral pockets to receive the parcels and wrappers, of means for supplying a web of wrapping-paper in succession to the pockets of said wheel, comprising intermittently-movable feed-rollers, a web-cutter intermittently operative to sever the web, an intermittently-movable vibratory tucker operative to force the severed side of the wrapper over the positioned parcels, a yielding abutment coöperating with said carrier-wheel to force the other side of the wrapper over the parcel, and a pair of twisters located one on each side of said carrier-wheel and operative on the ends of the wrapper to twist the same, substantially as described.

5. In a machine of the kind described, the combination with means for applying wrappers to the parcels, a pair of rotary twisters operative to twist the opposite ends of the applied wrapper, of a parcel-feeding device comprising a rotary table having a plurality of parcel-receptacles, a parcel-supporting table underlying the parcel-receptacles of said rotary table, but having a parcel-passage at one point, and a parcel-positioning device operating intermittently to force the parcels from the receptacles of said rotary table through an opening in said supporting-table and to the said wrapper-applying means, substantially as described.

6. In a machine of the kind described, the combination with a wrapper-applying mechanism, of a fixed table having a yielding parcel-support, a rotary table overlying said fixed table and having parcel-receptacles movable in succession, to a point above said yielding parcel-support, and a reciprocatory parcel-positioning device operative to force the parcel positioned above said yielding support from thence to said wrapper-applying mechanisms, substantially as described.

7. In a machine of the kind described, the combination with an intermittently-movable carrier-wheel having pockets to receive the parcels and wrappers, of a fixed table overlying said carrier-wheel, a yielding parcel-support positioned directly above said carrier-wheel, a rotary table overlying said fixed table and provided with a plurality of parcel-receptacles movable in succession into alinement with said yielding support, a reciprocatory parcel-positioning device operative to force the parcels from said yielding support into the underlying pocket of said carrier-wheel, and twisters located one on each side of said carrier-wheel and operative to twist the ends of the applied wrapper, substantially as described.

8. In a machine of the kind described, the combination with an intermittently-movable carrier-wheel having a peripheral pocket to receive the parcels and wrappers, a fixed table overlying said carrier-wheel and provided with a yielding support located directly above said carrier-wheel, and intermittently-movable rotary table overlying said fixed table and provided with a parcel-receptacle movable in succession into alinement with said yielding support, a reciprocatory parcel-positioning device operative to force the parcel from said yielding support and to the underlying pocket of said carrier-wheel, a yielding abutment coöperating with said carrier-wheel, and a pair of twisters located one on each side of said carrier-wheel and operative on the ends of the applied wrapper, to twist the same, substantially as described.

9. In a machine of the kind described, the combination with an intermittently-movable carrier-wheel having peripheral pockets to receive the parcels and wrappers, of means for supplying the wrappers to the pockets of said carrier-wheel from a continuous web of paper, a yielding abutment coöperating with said carrier-wheel, a vibratory tucker operative to force the wrappers over the positioned parcels, a fixed table overlying said carrier-wheel and provided with a yielding parcel-support located directly above said carrier-wheel, an intermittently-movable rotary table overlying said fixed table, and provided with parcel-receptacles movable in succession into alinement with said yielding support, and an intermittently-movable reciprocatory parcel-positioning device operative to force the parcels from said yielding support into the underlying pocket of said carrier-wheel, substantially as described.

10. In a machine of the kind described, the combination with an intermittently-movable carrier-wheel having peripheral pockets adapted to receive the parcels and wrappers, of an intermittently-operative feed device for supplying the web of paper to said carrier-wheel, an intermittently-operative cutter for severing the wrappers from said web, a vibratory tucker for forcing the cut side of the wrapper over the positioned parcel, a yielding abutment coöperating with said carrier-wheel to hold the wrapper onto the positioned parcel, a pair of intermittently-operative twisters, one on each side of said carrier-wheel, a fixed table overlying said carrier-wheel and provided with a yielding parcel-support located directly above said carrier-wheel, an intermittently-movable rotary table overlying said fixed table and provided with a plurality of parcel-receptacles movable, in succession, into alinement with said yielding support, and a reciprocatory parcel-positioning device operative to force the parcels from said yielding support into the underlying pocket of said carrier-wheel, substantially as described.

11. In a machine of the kind described, the combination with means for applying wrappers to parcels, of a pair of yieldingly-mounted parcel-supporting dogs, and a reciprocatory parcel-positioning device having a pronged head 26 adapted to directly engage and to press said dogs and to force the parcel therefrom to the wrapper-applying mechanism, substantially as described.

12. In a machine of the kind described, a wrapper-twisting device comprising a pair of rotary jaws, means tending to press the said jaws together, cam-lugs on the said jaws, a stem having cam-lugs operative on the cam-lugs of said jaws, to force the jaws apart, under rotary movements of the latter, and means for oscillating said stem in the one direction to accelerate the closing of said jaws and for moving the said stem and its cam-lugs in the opposite direction to delay the opening of the jaws, substantially as described.

In testimony whereof we affix our signatures in presence of two witnesses.

MAXIMILIAN E. BUHSE.
WALTER W. BUHSE.
HENRY L. BUHSE.
ALEXANDER F. BUHSE.

Witnesses:
H. D. KILGORE,
F. D. MERCHANT.